(12) United States Patent
Suzuki et al.

(10) Patent No.: US 7,693,639 B2
(45) Date of Patent: Apr. 6, 2010

(54) VEHICLE DYNAMICS CONTROL APPARATUS

(75) Inventors: Hidetoshi Suzuki, Kanagawa (JP); Nobuyuki Tanaka, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 119 days.

(21) Appl. No.: 10/834,373

(22) Filed: Apr. 29, 2004

(65) Prior Publication Data

US 2004/0267427 A1 Dec. 30, 2004

(30) Foreign Application Priority Data

Apr. 30, 2003 (JP) ............... 2003-125200

(51) Int. Cl.
  *G06F 17/00* (2006.01)
  *B60T 8/24* (2006.01)
(52) U.S. Cl. .............. 701/71; 701/91; 701/69; 303/190; 303/146; 180/197
(58) Field of Classification Search ........... 701/69, 701/72, 78, 83, 88, 89, 82, 81, 91, 71, 70; 707/71, 91, 69, 70, 82; 180/197; 303/140, 303/146, 139, 136, 190; 477/182
See application file for complete search history.

(56) References Cited

U.S. PATENT DOCUMENTS 6,077,190 A  6/2000 Tabata et al.
6,325,469 B1 * 12/2001 Carson et al. ............... 303/140
6,564,140 B2 *  5/2003 Ichikawa et al. ............ 701/91
6,702,717 B2 *  3/2004 Murakami .................. 477/182
7,031,819 B2 *  4/2006 Hack et al. .................. 701/82
2002/0180265 A1  12/2002 Jokic et al.
2003/0218378 A1  11/2003 Tanaka et al.

FOREIGN PATENT DOCUMENTS

| EP | 1 059 216 A2 | 12/2000 |
| EP | 1 179 464 A2 | 2/2002 |
| JP | 07-009977 A | 1/1995 |
| JP | 2000-344077 A | 12/2000 |

* cited by examiner

*Primary Examiner*—Khoi Tran
*Assistant Examiner*—Ronnie Mancho
(74) *Attorney, Agent, or Firm*—Foley & Lardner LLP

(57) ABSTRACT

A vehicle dynamics control (VDC) apparatus for an automotive vehicle with a differential limiting device capable of limiting at least one of a differential motion between front and rear wheel axles and a differential motion between left and right wheel axles, includes a VDC system that controls a braking force of at least one of road wheels to control vehicle cornering behavior depending on a vehicle's turning condition independently of a driver's braking action. The VDC system advances a VDC initiation timing used in a differential limited state in which at least one of the front-and-rear wheel axle differential motion and the left-and-right wheel axle differential motion is limited, in comparison with a VDC initiation timing used in a differential non-limited state in which the front-and-rear wheel axle differential motion and the left-and-right wheel axle differential motion are allowed.

6 Claims, 7 Drawing Sheets

VEHICLE DYNAMICS CONTROL APPARATUS

TECHNICAL FIELD

The present invention relates to a vehicle dynamics control (VDC) apparatus for an automotive vehicle with a vehicle dynamics control (VDC) system capable of controlling a yawing motion of the vehicle by controlling a braking force of at least one road wheel, and a differential limiting device capable of limiting a differential motion between front and rear wheel axles and/or a differential motion between left and right wheel axles, and specifically to the improvement of vehicle dynamics control technologies in a differential limited state and in a differential non-limited state.

BACKGROUND ART

In recent years, there have been proposed and developed various vehicle dynamics control technologies or various vehicle-behavior control technologies suitable for automotive vehicles employing a differential limiting control system, capable of limiting differential actions of respective differential units, such as a center differential, and front and rear differentials. One such vehicle dynamics control apparatus has been disclosed in Japanese Patent Provisional Publication No. 2000-344077 (hereinafter is referred to as "JP2000-344077"), corresponding to European Patent Application No. 00 112 237.3 whose date of filing is Jun. 7, 2000. As is generally known, there is a difference between a change in dynamic vehicle behavior in a locked state of a center differential and a change in dynamic vehicle behavior in a free state of the center differential. In due consideration of such a difference of the dynamic-vehicle-behavior change between the differential lock state and the differential free state, the vehicle-behavior control apparatus disclosed in JP2000-344077 operates to reduce engine power output and additionally to inhibit braking force control for each individual road wheel in the center-differential locked state. Thus, instead of using vehicle behavior control suitable for a two-wheel-drive (2WD) mode, vehicle behavior control peculiar to a four-wheel-drive (4WD) mode has to be used. Generally, there are the following three ways to control dynamic vehicle behavior during the 4WD mode in which the center differential is locked.

① The first way is to change (or to reduce) the magnitude of a braking force applied to each road wheel, during vehicle dynamics control in the center-differential lock mode (or in the 4WD mode).

② The second way is to inhibit braking force control for each individual road wheel, during vehicle dynamics control in the center-differential lock mode (or in the 4WD mode)

③ The third way is to reduce engine power output under a condition that braking force control is inhibited, during vehicle dynamics control in the center-differential lock mode (or in the 4WD mode).

SUMMARY OF THE INVENTION

However, in the previously described ways ①, ②, and ③ to control dynamic vehicle behavior during the 4WD mode in which the center differential is locked, there are the following drawbacks.

(1) When simply reducing a braking-force-control controlled variable (a braking force applied to each road wheel) during vehicle dynamics control in the 4WD mode (in other words, during executions of both of vehicle dynamics control and differential limiting control) according to the first way ①, there is a possibility that a yaw rate of a vehicle, which is subjected to vehicle dynamics control, cannot be easily brought closer to a desired yaw rate. On the one hand, reducing the braking-force-control controlled variable during vehicle dynamics control in the center-differential lock mode (or in the 4WD mode) contributes to the properly suppressed control interference between vehicle dynamics control and four-wheel-drive control (differential limiting control). On the other hand, reducing the braking-force-control controlled variable during vehicle dynamics control in the center-differential lock mode (or in the 4WD mode) means that the ability to stabilize dynamic vehicle behavior is undesirably lowered owing to a reduction in the controlled variable (e.g., a yaw rate or a yaw moment) of vehicle dynamics control, resulting from the totally reduced braking force.

(2) According to the second way ②, the braking force control itself is inhibited during vehicle dynamics control in the center-differential lock mode (or in the 4WD mode). Thus, it is impossible to practically execute the vehicle dynamics control action by which dynamic vehicle behavior is improved. When there is an increased tendency for the dynamic vehicle behavior to change, for instance, when the vehicle's understeer tendency starts to develop or when the vehicle's oversteer tendency starts to develop, it is impossible to practically suppress the vehicle behavior change, such as understeer or oversteer tendencies, owing to inhibition of braking force control.

(3) According to the third way ③, the engine output is reduced during vehicle dynamics control in the 4WD mode. Such a reduction in engine output is not correlated to a change in the controlled variable (e.g., a yaw rate or a yaw moment) of vehicle dynamics control, in other words, a yawing motion or a yaw rotation of the vehicle about the z-axis of the vehicle axis system (x, y, z). Thus, it is impossible to practically execute the vehicle dynamics control action by which dynamic vehicle behavior is improved.

Accordingly, it is an object of the invention to provide a vehicle dynamics control apparatus, capable of eliminating any unnatural feeling (e.g., an unintended vehicle deceleration) that the driver may experience during cornering in a differential non-limited state, suppressing undesired control interference between vehicle dynamics control and differential limiting control during cornering in a differential limited state, and enhancing the ability to stabilize dynamic vehicle behavior during cornering in the differential limited state.

In order to accomplish the aforementioned and other objects of the present invention, a vehicle dynamics control (VDC) apparatus for an automotive vehicle with a differential limiting device capable of limiting at least one of a differential motion between front and rear wheel axles and a differential motion between left and right wheel axles, comprises a VDC system that controls a braking force of at least one of road wheels to control vehicle cornering behavior depending on a vehicle's turning condition independently of a driver's braking action, and the VDC system advancing a VDC initiation timing used in a differential limited state in which at least one of the front-and-rear wheel axle differential motion and the left-and-right wheel axle differential motion is limited, in comparison with a VDC initiation timing used in a differential non-limited state in which the front-and-rear wheel axle differential motion and the left-and-right wheel axle differential motion are allowed.

According to another aspect of the invention, a vehicle dynamics control (VDC) apparatus for an automotive vehicle with differential limiting means for limiting at least one of a differential motion between front and rear wheel axles and a differential motion between left and right wheel axles, comprises vehicle dynamics control (VDC) means for controlling a braking force of at least one of road wheels to control vehicle cornering behavior depending on a vehicle's turning condition independently of a driver's braking action, and the VDC means advancing a VDC initiation timing used in a differential limited state in which at least one of the front-and-rear wheel axle differential motion and the left-and-right wheel axle differential motion is limited, in comparison with a VDC initiation timing used in a differential non-limited state in which the front-and-rear wheel axle differential motion and the left-and-right wheel axle differential motion are allowed.

According to a further aspect of the invention, a method of controlling vehicle cornering behavior of an automotive vehicle with a differential limiting device capable of limiting at least one of a differential motion between front and rear wheel axles and a differential motion between left and right wheel axles, the method comprising controlling a braking force of at least one of road wheels to execute vehicle dynamics control (VDC) by which the vehicle cornering behavior is controlled depending on a vehicle's turning condition independently of a driver's braking action, detecting whether the vehicle is in a differential limited state in which at least one of the front-and-rear wheel axle differential motion and the left-and-right wheel axle differential motion is limited or in a differential non-limited state in which the front-and-rear wheel axle differential motion and the left-and-right wheel axle differential motion are allowed, and advancing a VDC initiation timing used in the differential limited state, in comparison with a VDC initiation timing used in the differential non-limited state.

The other objects and features of this invention will become understood from the following description with reference to the accompanying drawings.

DESCRIPTION OF THE PREFERRED EMBODIMENTS

Figure 1:
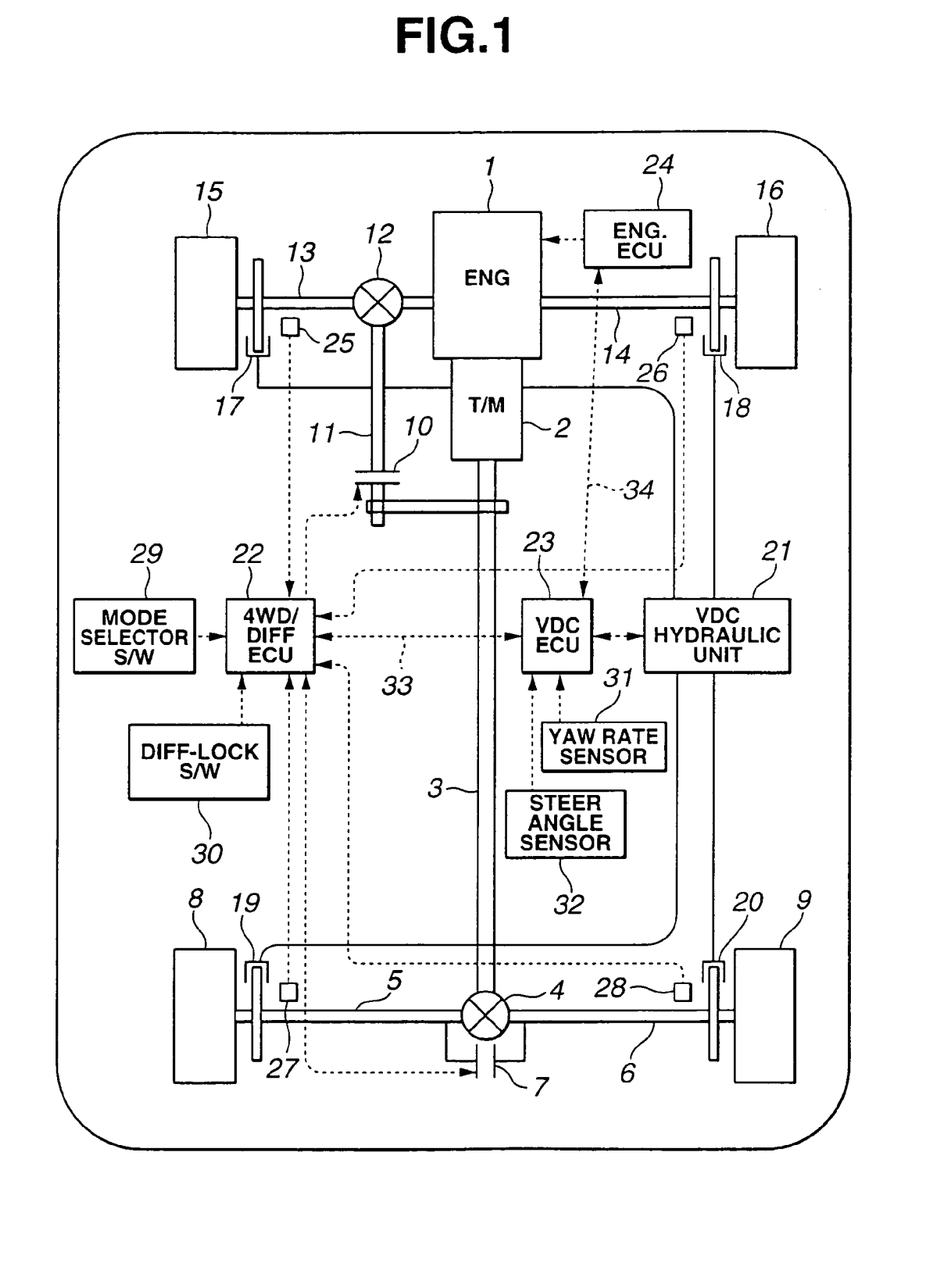
FIG. 1 is a general system diagram illustrating an embodiment of a vehicle dynamics control (VDC) apparatus, which is applicable to a four-wheel-drive (4WD) vehicle whose basic drive mode is a rear-wheel-drive mode (2WD mode).

Referring now to the drawings, particularly to FIG. 1, the vehicle dynamics control (VDC) apparatus of the embodiment is exemplified in a four-wheel-drive (4WD) vehicle, which employs a transfer clutch 10 and a differential limiting clutch 7, and whose basic drive mode is a rear-wheel-drive mode.

As shown in FIG. 1, transfer clutch 10 serves as a differential limiting means that limits a differential motion between a front wheel axle for front-left and front-right road wheels 15 and 16 and a rear wheel axle for rear-left and rear-right road wheels 8 and 9. In a differential non-limited state (in a disengaged state of transfer clutch 10) in which a front-and-rear wheel speed difference is allowed, engine power output (driving torque) is transmitted from an engine 1 through a transmission 2 and a rear propeller shaft 3 to a rear differential 4, and then transmitted via rear-left and rear-right axle driveshafts 5 and 6 to rear-left and rear-right wheels 8 and 9, so as to attain a rear-wheel-drive mode (a 2WD mode) in which the differential motion between front and rear wheel axles is allowed.

In a differential limited state (in an engaged state of transfer clutch 10) in which a front-and-rear wheel speed difference is limited, part of engine power output (driving torque) is delivered through rear propeller shaft 3, rear differential 4, and rear axle driveshafts 5 and 6 to rear wheels 8 and 9. At the same time, the remaining driving torque is transferred through a front propeller shaft 11 to a front differential 12, and then transferred via front-left and front-right axle driveshafts 13 and 14 to front-left and front-right wheels 15 and 16, so as to attain a four-wheel-drive mode (a 4WD mode) in which the differential motion between front and rear wheel axles is limited.

Differential limiting clutch 7, exactly, a rear differential limiting clutch, is provided between rear axle driveshafts 5 and 6. Differential limiting clutch 7 serves as a differential limiting means that limits a differential motion between a rear-left wheel axle (rear-left axle driveshaft 5) for rear-left road wheel 8 and a rear-right wheel axle (rear-right axle driveshaft 6). When fully engaging differential limiting clutch 7, the differential action of rear differential 4 is inhibited and thus rear differential 4 is conditioned in the differential lock state in which the wheel speed difference between rear-left and rear-right wheels 8 and 9 is limited or there is a less left-and-right wheel speed difference. Conversely when disengaging differential limiting clutch 7, the differential action of rear differential 4 is allowed and thus rear differential 4 is conditioned in the differential unlock state (in the differential free state) in which the wheel speed difference between rear-left and rear-right wheels 8 and 9 is permitted and thus there is a remarkable left-and-right wheel speed difference during cornering.

In the VDC apparatus of the embodiment shown in FIG. 1, as a braking force control system, which regulates hydraulic brake pressures of individual wheel-brake cylinders (i.e., front-left, front-right, rear-left, and rear-right wheel-brake cylinders 17, 18, 19, and 20) independently of each other, a four-channel braking control system such as a four-channel ABS system for anti-skid control or a four-channel traction control system for traction control is utilized. Front-left, front-right, rear-left, and rear-right wheel-brake cylinder pressures are regulated independently of each other, irrespective of whether a brake pedal is undepressed or depressed by the driver, by means of a VDC hydraulic modulator unit (simply, a VDC hydraulic unit) 21, which is disposed between a master cylinder (not shown) and each of wheel-brake cylinders 17-20.

An electronic 4WD-and-diff control unit or an electronic transfer-and-diff control unit (4WD/DIFF ECU) 22 generally comprises a microcomputer. 4WD/DIFF ECU 22 includes an input/output interface (I/O), memories (RAM, ROM), and a microprocessor or a central processing unit (CPU). The input/output interface (I/O) of 4WD/DIFF ECU 22 receives input information from vehicle switches and sensors, namely front-left, front-right, rear-left, and rear-right wheel speed sensors 25, 26, 27, and 28, a drive mode selector switch (simply, a mode selector switch) 29, and a rear differential lock switch (simply, a diff-lock switch) 30 Front-left and front-right wheel speed sensors 25 and 26 are located at the respective front road wheels 15 and 16, to sense front-left and front-right wheel speeds $Vw_{FL}$ and $Vw_{FR}$. Rear-left and rear-right wheel speed sensors 27 and 28 are located at the respective rear road wheels 8 and 9, to sense rear-left and rear-right wheel speeds $Vw_{RL}$ and $Vw_{RR}$. Mode selector switch 29 serves as a man-machine interface. Mode selector switch 29 is located at such a position as to be easily manipulated by the driver, for example in an automobile instrument panel containing indicating meters or an instrument cluster assembly. Mode selector switch 29 is manually operated by the driver to switch from one of a two-wheel-drive (2WD) mode, an AUTO mode (or an active torque-split mode), and a rigid four-wheel-drive (4WD) mode to the other. When the 2WD mode is manually selected via mode selector switch 29, the output interface circuitry of 4WD/DIFF ECU 22 generates a command signal to transfer clutch 10 to disengage transfer clutch 10 and to realize the 2WD mode (the rear-wheel-drive mode). When the AUTO mode (the torque split mode) is manually selected via mode selector switch 29, the output interface circuitry of 4WD/DIFF ECU 22 generates a command signal to transfer clutch 10 to properly adjust the magnitude of the engagement force of transfer clutch 10 depending on the front-and-rear wheel speed difference, such as the degree of acceleration slip, and consequently to change the torque-distribution ratio between driving torque delivered to the front wheel axle and driving torque delivered to the rear wheel axle, and thus to realize the AUTO mode (the active torque split mode). On the contrary when the rigid 4WD mode is manually selected via mode selector switch 29, the output interface circuitry of 4WD/DIFF ECU 22 generates a command signal to transfer clutch 10 to fully engage transfer clutch 10 and to realize the rigid 4WD mode. Diff-lock switch 30 also serves as a man-machine interface. Diff-lock switch 30 is located at such a position as to be easily manipulated by the driver, for example in an automobile instrument panel or an instrument cluster assembly. When diff-lock switch 30 is manually turned ON, differential limiting clutch 7 is fully engaged to inhibit the differential action of rear differential 4, and thus rear differential 4 is held in the differential lock state in which the wheel speed difference between rear wheels 8 and 9 is not allowed.

An electronic vehicle dynamics control unit (VDC ECU) 23 generally comprises a microcomputer. As seen from the system diagram of FIG. 1, for mutual communication via a two-way communication line 33, VDC ECU 23 is electrically connected to 4WD/DIFF ECU 22. Additionally, for mutual communication via a data link (a two-way communication line), VDC ECU 23 is electrically connected to VDC hydraulic unit 21. VDC ECU 23 includes an input/output interface (I/O), memories (RAM, ROM), and a microprocessor or a central processing unit (CPU). The input/output interface (I/O) of VDC ECU 23 receives input information from vehicle sensors, namely a yaw rate sensor 31 and a steer angle sensor 32, and input information from 4WD/DIFF ECU 22, regarding wheel speeds $Vw_{FL}$, $Vw_{FR}$, $Vw_{RL}$, and $Vw_{RR}$, and regarding which state the transfer clutch 10 is in and regarding which state the rear differential 4 is in. The input/output interface (I/O) of VDC ECU 23 also receives input information from VDC hydraulic unit 21 regarding manipulated variables of the four wheel brakes. Actually, the manipulated variables of the four wheel brakes are detected by means of pressure sensors disposed in VDC hydraulic unit 21. Yaw rate sensor 31 is provided to detect a yaw rate (an actual yaw rate $\phi$), resulting from a yaw moment acting on the vehicle. Steer angle sensor 32 is provided to detect a steer angle $\delta$ of a steering wheel (not shown). The processor of VDC ECU 23 calculates or estimates a desired yaw rate $\phi^*$, based on input information from steer angle sensor 32, indicative of steer angle $\delta$, and input information from VDC hydraulic unit 21 regarding manipulated variables of the four wheel brakes. The processor of VDC ECU 23 compares the actual yaw rate $\phi$ based on the yaw-rate information detected by yaw rate sensor 31, with the desired yaw rate $\phi^*$ calculated or estimated based on the steer angle $\delta$ and the manipulated variable of each wheel brake, so as to arithmetically calculate or derive a yaw-rate deviation $\Delta\phi n$ ($=\phi-\phi^*$) of the actual yaw rate $\phi$ from the desired yaw rate $\phi^*$. Within the processor of VDC ECU 23, a further check is made to determine whether yaw-rate deviation $\Delta\phi n$ ($=\phi-\phi^*$) exceeds a VDC initiation threshold value ($\alpha, \beta$), which will be hereinafter described in detail in reference to the flow chart shown in FIG. 2. When yaw-rate deviation $\Delta\phi n$ exceeds the VDC initiation threshold value, VDC ECU 23 engages or enables the vehicle dynamics control (VDC) function to initiate vehicle dynamics control. Conversely when yaw-rate deviation $\Delta\phi n$ is less than or equal to the VDC initiation threshold value, VDC ECU 23 disengages or disables the vehicle dynamics control (VDC) function to inhibit vehicle dynamics control. In the VDC apparatus of the shown embodiment, the vehicle dynamics control is achieved as follows.

First, within the processor of VDC ECU 23, front-left, front-right, rear-left, and rear-right desired wheel-brake cylinder pressures are calculated and determined based on yaw-rate deviation $\Delta\phi n$ ($=\phi-\phi^*$) Thereafter, command signals corresponding to front-left, front-right, rear-left, and rear-right desired wheel-brake cylinder pressures calculated, are output from the output interface of VDC ECU 23 to VDC hydraulic unit 21, so as to adjust the wheel-brake cylinder pressures based on the command signals and to reduce the yaw-rate deviation $\Delta\phi n$. At the same time, during the vehicle dynamics control, the output interface of VDC ECU 23 generates a command signal via a two-way communication line 34 to an electronic engine control unit (ENG. ECU) 24, so as to decreasingly compensate for the engine power output by way of fuel-cutoff operation or throttle-opening reduction.

Figure 2:
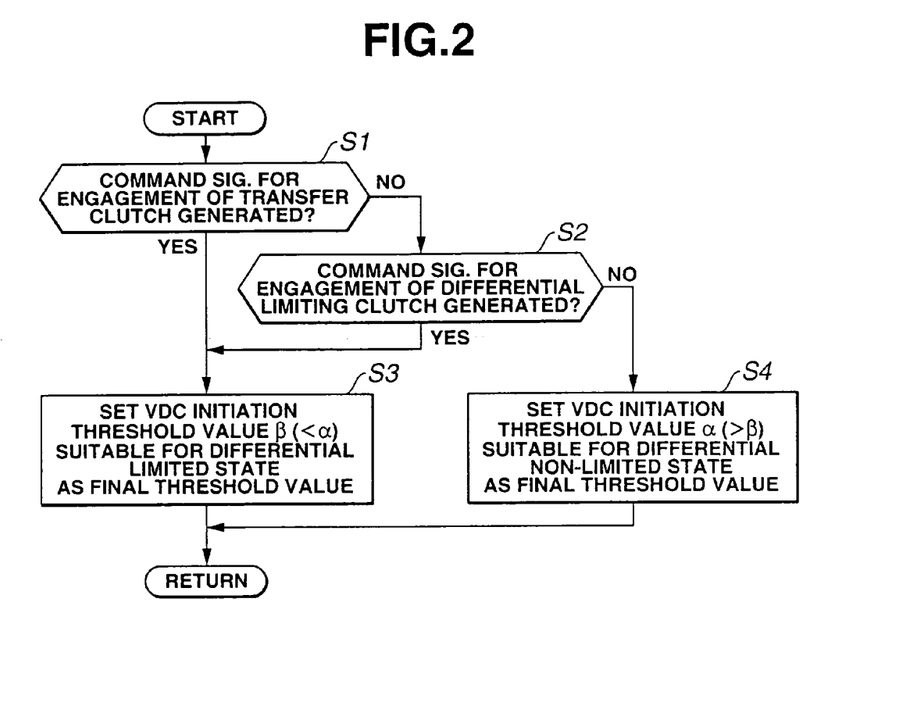
FIG. 2 is a flow chart showing a vehicle dynamics control (VDC) routine (or a vehicle behavior control (VBC) routine) executed within a VDC electronic control unit (VDC ECU) incorporated in the VDC apparatus of the embodiment.

Referring now to FIG. 2, there is shown the vehicle dynamics control (VDC) routine executed within the processor of VDC ECU 23 incorporated in the VDC apparatus of the embodiment. The VDC routine is executed as time-triggered interrupt routines to be triggered every predetermined sampling time intervals.

At step S1, a check is made to determine, based on input information from 4WD/DIFF ECU 22 regarding which state the transfer clutch 10 is in, whether a command signal generated from 4WD/DIFF ECU 22 for full engagement of transfer clutch 10 is present or absent. When the answer to step S1 is in the affirmative (YES), that is, in presence of the output of the command signal for full engagement of transfer clutch 10, the routine proceeds from step S1 to step S3. Conversely when the answer to step S1 is in the negative (NO), that is, in absence of the output of the command signal for full engagement of transfer clutch 10, the routine proceeds from step S1 to step S2.

At step S2, a check is made to determine, based on input information from 4WD/DIFF ECU 22 regarding which state the rear differential 4 is in, whether a command signal generated from 4WD/DIFF ECU 22 to differential limiting clutch 7 for full engagement of differential limiting clutch 7 (in other words, for the rear differential lock mode) is present or absent. When the answer to step S2 is in the affirmative (YES), that is, in presence of the output of the command signal for full engagement of differential limiting clutch 7, the routine proceeds from step S2 to step S3. Conversely when the answer to step S2 is negative (NO), that is, in absence of the output of the command signal for full engagement of differential limiting clutch 7, the routine proceeds from step S2 to step S4.

At step S3, a VDC initiation threshold value $\beta$ suitable for the differential limited state is set as a final VDC initiation threshold value, which is compared to the calculated yaw-rate deviation $\Delta\phi n$ $(=\phi-\phi^*)$ and used as a decision criterion for initiating vehicle dynamics control. After step S3, the main program is returned. Note that VDC initiation threshold value $\beta$ $(<\alpha)$ suitable for the differential limited state is predetermined to be relatively lower than a normal VDC initiation threshold value $\alpha$ suitable for the differential non-limited state. In the VDC apparatus of the shown embodiment, VDC initiation threshold value $\beta$ $(<\alpha)$ suitable for the differential limited state is predetermined as follows.

$$\beta = 0.4 \times \alpha$$

When the answer to step S1 is negative (NO) and the answer to step S2 is negative (NO), that is, in the differential non-limited state of the differential motion between front and rear wheel axles and in the differential non-limited state of the differential motion between rear-left and rear-right wheel axles, at step S4 normal VDC initiation threshold value $\alpha$ suitable for the differential non-limited state is set as the final VDC initiation threshold value. After step S4, the main program is returned.

[Vehicle Dynamics Control (VDC) Action in 2WD Mode]

In a differential non-limited state where differential limiting clutch 7 and transfer clutch 10 are both disengaged, in other words, in the rear-wheel-drive mode (in the 2WD mode), the VDC routine of FIG. 2 flows from step S1 through step S2 to step S4. Thus, at step S4, normal VDC initiation threshold value $\alpha$ suitable for the differential non-limited state is set as the final VDC initiation threshold value. During cornering, a degree of vehicle understeer or a degree of vehicle oversteer can be computed or estimated based on the calculated yaw-rate deviation $\Delta\phi n$ $(=\phi-\phi^*)$. When yaw-rate deviation $\Delta\phi n$ $(=\phi-\phi^*)$ exceeds normal VDC initiation threshold value $\alpha$ suitable for the differential non-limited state, for example, when the vehicle understeer tendency starts to develop or when the vehicle oversteer tendency starts to develop, the VDC function is enabled and thus the vehicle dynamics control is initiated such that the actual yaw rate $\phi$ is brought closer to the desired yaw rate $\phi^*$ by way of feedback control.

Figure 6:
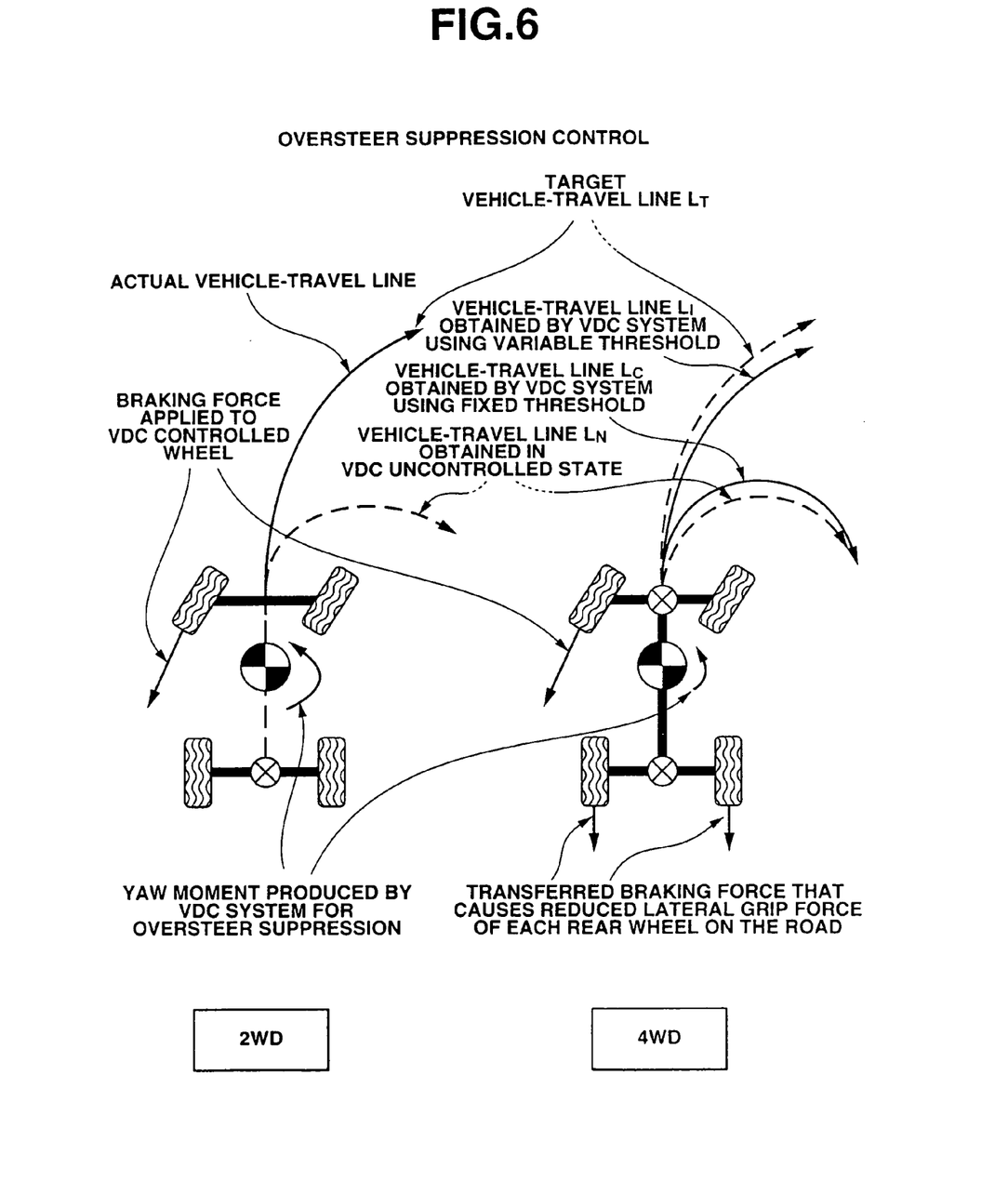
FIG. 6 is an explanatory view showing comparison results of a line indicating vehicle travel produced during oversteer suppression control in the 2WD mode, a line indicating vehicle travel produced during oversteer suppression control of the VDC system of the embodiment using the variable VDC initiation threshold in the 4WD mode, and a line indicating vehicle travel produced during oversteer suppression control of the VDC system using the fixed VDC initiation threshold in the 4WD mode.

For instance, during lane-changing on the slippery road surface, concretely during lane-changing to the right in the 2WD mode (see the left-hand half of FIG. 6), the processor of VDC ECU 23 computes or estimates, based on yaw-rate deviation $\Delta\phi n$ $(=\phi-\phi^*)$, the degree of vehicle oversteer. If the processor of VDC ECU 23 determines that the vehicle oversteer tendency is great, VDC ECU 23 operates to reduce the engine power output based on the degree of vehicle oversteer, so as to improve the stability in lane change maneuvers. Simultaneously, in order to produce a yawing moment (an oversteer suppression moment) based on the degree of vehicle oversteer and tending to rotate the vehicle in a direction (counterclockwise when looking the plan view of FIG. 6) that the vehicle oversteer tendency is reduced, a braking force applied to each road wheel is properly controlled. As can be appreciated from the left-hand half of FIG. 6, showing oversteer suppression control (vehicle dynamics control executed under the vehicle oversteer condition in the 2WD mode), as an example of oversteer suppression moment application, a braking force needed for oversteer suppression control is applied to the front wheel of the faster-turning outer wheels. In lieu thereof, braking forces needed for oversteer suppression control may be applied to the respective faster-turning outer wheels.

Figure 7:
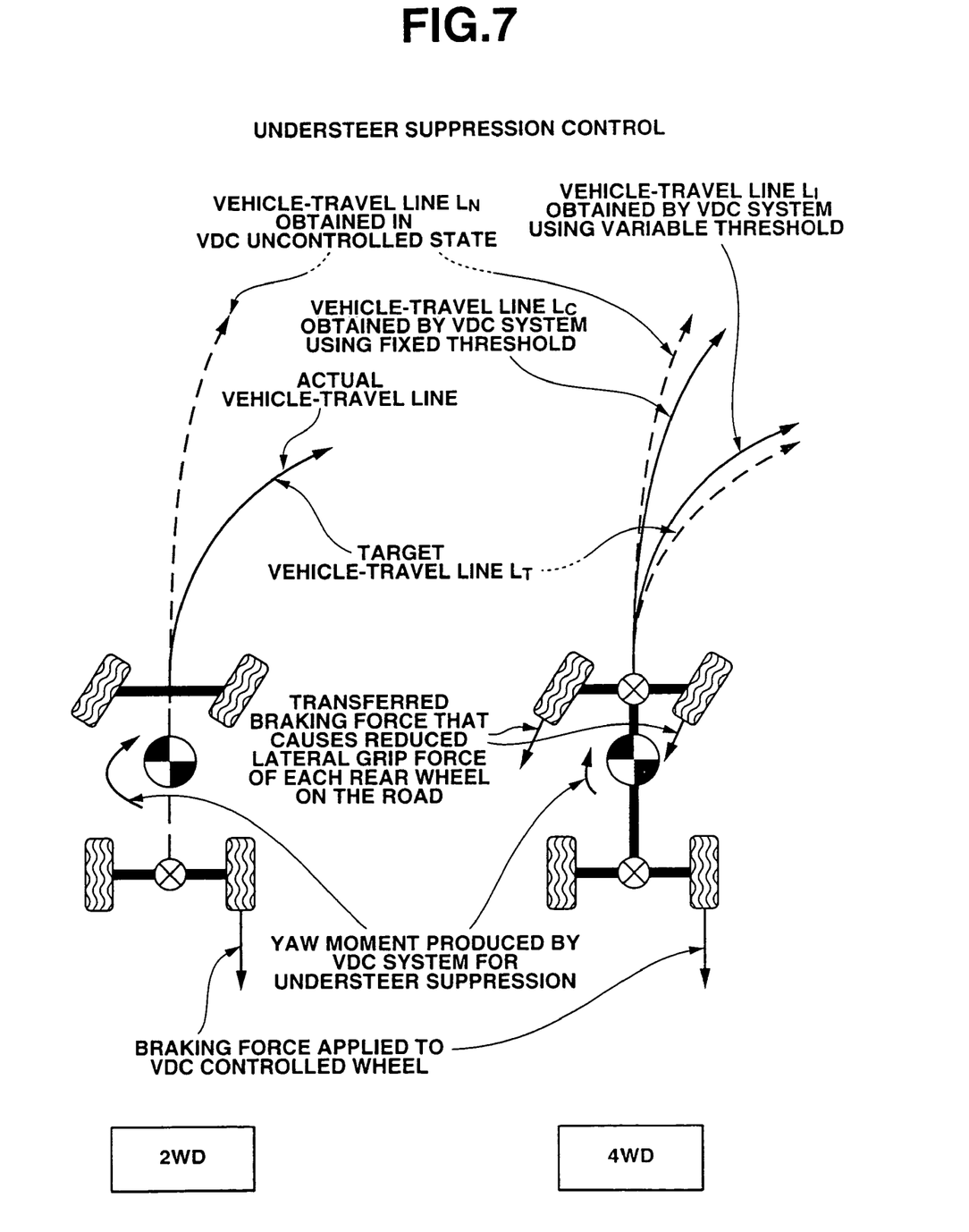
FIG. 7 is an explanatory view showing comparison results of a line indicating vehicle travel produced during understeer suppression control in the 2WD mode, a line indicating vehicle travel produced during understeer suppression control of the VDC system of the embodiment using the variable VDC initiation threshold in the 4WD mode, and a line indicating vehicle travel produced during understeer suppression control of the VDC system using the fixed VDC initiation threshold in the 4WD mode.

When the processor of VDC ECU 23 determines, based on yaw-rate deviation $\Delta\phi n$ $(=\phi-\phi^*)$, that the vehicle understeer tendency is great during cornering on the slippery road surface, concretely during cornering to the right in the 2WD mode (see the left-hand half of FIG. 7), VDC ECU 23 properly controls a braking force applied to each road wheel to produce a yawing moment (an understeer suppression moment) based on the degree of vehicle understeer and tending to rotate the vehicle in a direction (clockwise when looking the plan view of FIG. 7) that the vehicle understeer tendency is reduced. As can be appreciated from the left-hand half of FIG. 7, showing understeer suppression control (vehicle dynamics control executed under the vehicle understeer condition in the 2WD mode), as an example of understeer suppression moment application, a braking force needed for understeer suppression control is applied to the rear wheel of the slower-turning inner wheels. In lieu thereof, braking forces needed for understeer suppression control may be applied to the respective slower-turning inner wheels.

In setting the previously-noted normal VDC initiation threshold value a suited for the rear-wheel-drive state (2WD mode), in other words, the differential non-limited state, for the purpose of eliminating any unnatural feeling experienced by the driver, such as an unintended vehicle deceleration, which may occur owing to an undesirably advanced VDC initiation timing during cornering in the 2WD mode with the VDC control system conditioned in the operative state, normal VDC initiation threshold value $\alpha$ contains a deadband to which the VDC control system will not effectively respond. For the reasons discussed above, normal VDC initiation threshold value $\alpha$ is predetermined to be relatively higher than VDC initiation threshold value $\beta$ suitable for the differential limited state, for prevention of undesirable hunting.

As appreciated from the above, according to the VDC apparatus of the embodiment, capable of executing the VDC routine of FIG. 2, the relatively lower VDC initiation threshold value $\beta$ (<$\alpha$) is set as the final VDC initiation threshold value, only in the differential limited state in which the differential motion between the front and rear wheel axles is limited with transfer clutch 10 engaged or the differential motion between the rear-left and rear-right wheel axles is limited with differential limiting clutch 7 engaged and thus there is an increased tendency for the controlled variable (actual yaw rate $\phi$) to remarkably deviate from the desired value (desired yaw rate $\phi$*) Therefore, due to the relatively higher VDC initiation threshold value $\alpha$, determined as the final VDC initiation threshold under the differential non-limited state, it is possible to prevent the vehicle dynamics control from being initiated at an undesirably earlier timing, and consequently to effectively eliminate unnatural feeling, such as an unintended vehicle deceleration, which the driver may experience during cornering in the differential non-limited state. In other words, due to the relatively lower VDC initiation threshold value $\beta$, determined as the final VDC initiation threshold under the differential limited state, it is possible to properly advance an initiation timing of vehicle dynamics control, and consequently to effectively suppress undesirable control interference between vehicle dynamics control and differential limiting control during cornering in the differential limited state, and additionally to enhance the ability to stabilize dynamic vehicle behavior during cornering in the differential limited state.

[VDC Action in Differential Limited State]

In a differential limited state where transfer clutch 10 is engaged, that is, in a differential limited state between front and rear wheel axles, the VDC routine of FIG. 2 flows from step S1 to step S3. Thus, at step S3, the relatively lower VDC initiation threshold value $\beta$ (<$\alpha$) suitable for the differential limited state is set as the final VDC initiation threshold value.

On the other hand, in a differential limited state where differential limiting clutch 7 is engaged, that is, in a differential limited state between rear-left and rear-right wheel axles, the VDC routine of FIG. 2 flows from step S1 via step S2 to step S3. Finally, at step S3, the relatively lower VDC initiation threshold value $\beta$ (<$\alpha$) suitable for the differential limited state is set as the final VDC initiation threshold value.

When the vehicle understeer tendency starts to develop during cornering or when the vehicle oversteer tendency starts to develop during cornering, the processor of VDC ECU 23 estimates, based on yaw-rate deviation $\Delta\phi n$ (=$\phi$-$\phi$*), the degree of understeer or the degree of oversteer. As soon as yaw-rate deviation $\Delta\phi n$ (=$\phi$-$\phi$*) exceeds VDC initiation threshold value $\beta$ (<$\alpha$) that is suitable for the differential limited state and that vehicle dynamics control easily quickly comes into operation, in other words, in presence of a slight vehicle understeer tendency or a slight vehicle oversteer tendency, the vehicle dynamics control can be quickly initiated in a manner so as to properly quickly adjust a braking force applied to each road wheel and to properly reduce the engine power output, and thus to bring the actual yaw rate $\phi$ closer to the desired yaw rate $\phi$* by way of feedback control.

Hereinafter described in detail by reference to the time charts of FIGS. 3A-3B, 4, and 5 are comparison results of control characteristics, containing VDC initiation and termination timings, and a braking force characteristic of the VDC controlled wheel subjected to vehicle dynamics control, between (i) the improved VDC system of the embodiment that executes the VDC routine of FIG. 2 and uses the variable VDC initiation threshold value ($\alpha$, $\beta$), and (ii) the VDC system using the fixed VDC initiation threshold value $\alpha$.

Figure 3A:
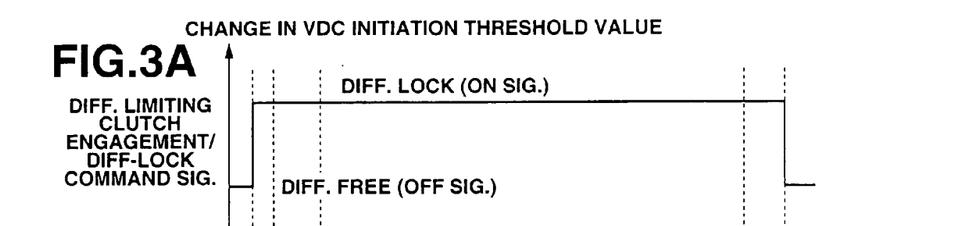
FIGS. 3A-3B are time charts explaining a VDC apparatus that a VDC initiation threshold is fixed permanently irrespective of whether the vehicle is in a differential limited state or in a differential non-limited state and an improved VDC apparatus of the embodiment that a VDC initiation threshold is variably adjusted or switchable depending on whether the vehicle is in a differential limited state or in a differential non-limited state.
Figure 3B:
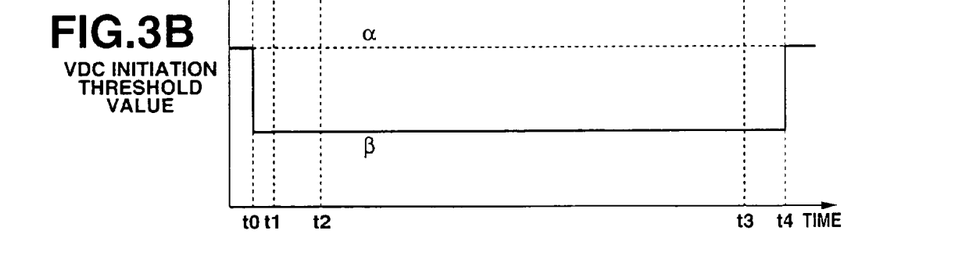

As shown in FIG. 3A, suppose that the output interface of 4WD/DIFF ECU 22 generates a command signal (ON signal) for full engagement of differential limiting clutch 7 at the time t0 and thus the operating mode of rear differential 4 is shifted from the differential free state to the differential lock state at the time t0, and the output interface of 4WD/DIFF ECU 22 generates a command signal (OFF signal) for disengagement of differential limiting clutch 7 at the time t4 and thus the operating mode of rear differential 4 is shifted again from the differential lock state to the differential free state at the time t4. As indicated by the solid line in FIG. 3B, according to the VDC system of the embodiment using the variable VDC initiation threshold value ($\alpha$, $\beta$), the final VDC initiation threshold value is switched from normal VDC initiation threshold value a suitable for the differential non-limited state to VDC initiation threshold value $\beta$ (<$\alpha$) suitable for the differential limited state at the time t0, and the final VDC initiation threshold value is switched from VDC initiation threshold value $\beta$ (<$\alpha$) to normal VDC initiation threshold value $\alpha$ at the time t4. On the contrary, as indicated by the broken line in FIG. 3B, according to the VDC system using the relatively higher fixed VDC initiation threshold value $\alpha$, the final VDC initiation threshold value remains fixed permanently at normal VDC initiation threshold value $\alpha$.

Figure 4:
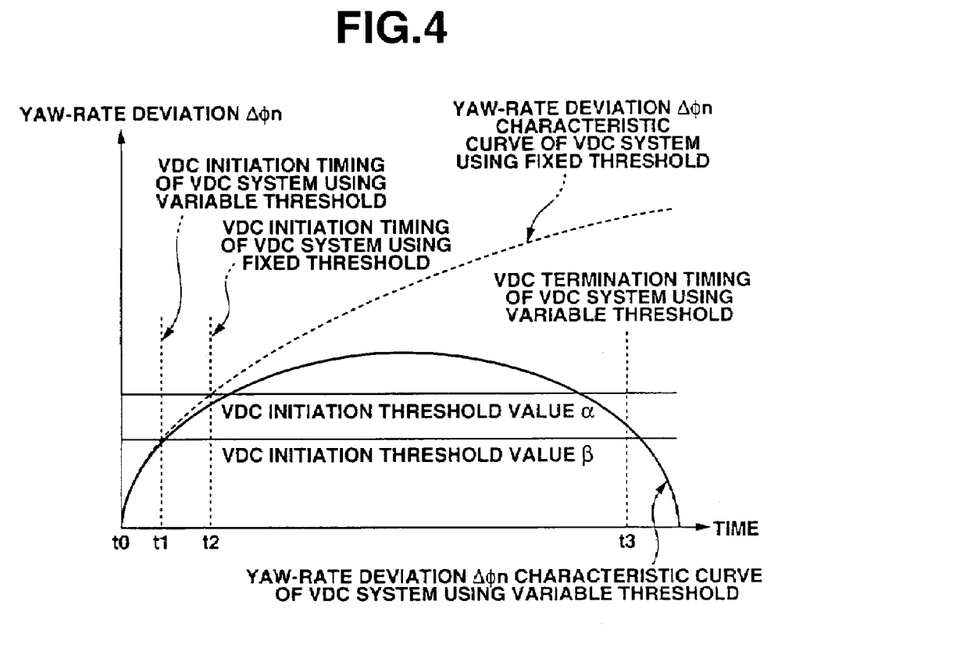
FIG. 4 is a comparative time chart showing VDC initiation and termination timings between the VDC system that the VDC initiation threshold is fixed and the improved VDC system of the embodiment that the VDC initiation threshold is variable or switchable.

As indicated by the solid line of FIG. 4, according to the VDC apparatus of the embodiment using the variable VDC initiation threshold value, which is switchable between the relatively higher VDC initiation threshold value $\alpha$ and the relatively lower VDC initiation threshold value $\beta$ depending on whether the vehicle is in the differential non-limited state or in the differential limited state, the processor of VDC ECU 23 determines that the vehicle has slight understeer or oversteer tendencies at the time t1 when yaw-rate deviation $\Delta\phi n$ (=$\phi$-$\phi$*) exceeds VDC initiation threshold value $\beta$ (<$\alpha$) suitable for the differential limited state. As a result, the VDC function is engaged at the time t1 to quickly initiate vehicle dynamics control. Owing to setting of the final VDC initiation threshold value to the relatively lower VDC initiation threshold value $\beta$ (<$\alpha$), the vehicle dynamics control is initiated at the relatively earlier timing (at the time t1). As a consequence, yaw-rate deviation $\Delta\phi n$ can rapidly converge to zero (see the falling curve indicated by the solid line in FIG. 4 at the time t3). Thus, it is possible to rapidly terminate the vehicle dynamics control at a relatively earlier timing (at the time t3).

In contrast to the above, as indicated by the broken line of FIG. 4, according to the VDC system using the fixed VDC initiation threshold value, the processor of VDC ECU 23 determines that the vehicle has strong understeer or oversteer tendencies at the relatively later timing t2 (in comparison with t1) when yaw-rate deviation $\Delta\phi n$ (=$\phi$-$\phi$*) exceeds normal VDC initiation threshold value $\alpha$ (>$\beta$). As a result, the VDC function is engaged at the time t2. That is to say, owing to the relatively higher fixed VDC initiation threshold value $\alpha$ (>$\beta$), the timing of initiation of vehicle dynamics control is somewhat retarded. Thus, as can be appreciated from the yaw-rate deviation $\Delta\phi n$ characteristic curve indicated by the broken line in FIG. 4, the VDC system using the relatively higher fixed VDC initiation threshold value $\alpha$, cannot yet exhibit the tendency of convergence of yaw-rate deviation $\Delta\phi n$ even after the time t3. As a result of the comparatively higher, fixed VDC initiation threshold value α, the vehicle dynamics control terminates at a considerably later timing from the time t3.

Figure 5:
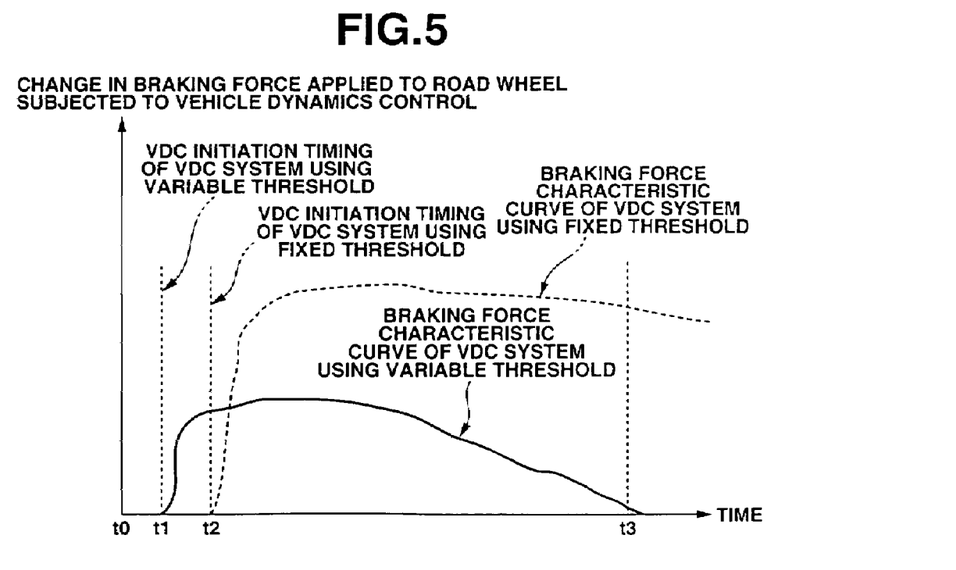
FIG. 5 is a characteristic diagram showing a braking-force characteristic curve obtained by the VDC system using the fixed VDC initiation threshold and a braking-force characteristic curve obtained by the VDC system of the embodiment.

As can be seen from the braking force characteristic curve indicated by the solid line in FIG. 5, according to the VDC system of the embodiment using the variable or switchable VDC initiation threshold value, by virtue of the vehicle dynamics control initiated at the relatively earlier timing t1, the braking force can be applied to the VDC controlled wheel, which is subjected to the vehicle dynamics control, at a relatively earlier timing. During the early stages of braking force application after initiation of the vehicle dynamics control, the level of the braking force applied for suppressing slight vehicle understeer or oversteer tendencies, is still low. Thus, it is possible to effectively rapidly suppress the slight vehicle understeer or oversteer tendencies by way of the relatively low braking force application at the earlier timing. As a result, as can be seen the braking force characteristic curve indicated by the solid line in FIG. 5, application of the relatively low braking force properly rapidly terminates at the same timing t3 when the vehicle dynamics control terminates.

On the contrary, as can be seen from the braking force characteristic curve indicated by the broken line in FIG. 5, according to the VDC system using the fixed VDC initiation threshold value, owing to the vehicle dynamics control initiated at the relatively later timing t2 than the time t1, the braking force is applied to the VDC controlled wheel, which is subjected to the vehicle dynamics control, at a relatively later timing. During the early stages of braking force application after initiation of the vehicle dynamics control, the level of the braking force, applied for suppressing strong vehicle understeer or oversteer tendencies developing adequately, is relatively high. Owing to both of the later timing of initiation of the vehicle dynamics control and the relatively high braking force application, as can be seen from the braking force characteristic curve indicated by the broken line in FIG. 5, the vehicle dynamics control tends to terminate at a considerably later timing from the time t3 and thus the braking force applied is maintained undesirably at a high level for a while even after the time t3.

[Control Interference]

Suppose that vehicle dynamics control suited to a two-wheel-drive (2WD) vehicle is simply applied to a four-wheel-drive (4WD) vehicle. In such a case, a braking force substantially corresponding to the braking force, which is applied to one of front-left and front-right road wheels during oversteer suppression control or applied to one of rear-left and rear-right road wheels during understeer suppression control, tends to be transferred from the VDC controlled wheel through transfer clutch 10 (differential limiting means that limits the differential motion between front and rear wheel axles) to a first wheel axle of the front and rear wheel axles, opposite to the second wheel axle associated with the VDC controlled wheel. Each road wheel, on which the transferred braking force acts, is hereinafter referred to as a "VDC noncontrolled wheel". Owing to the transferred braking force, a lateral grip force of each VDC noncontrolled wheel on the road tends to reduce, and therefore there is a possibility that the ability to stabilize dynamic vehicle behavior is undesirably lowered.

As can be seen from the left-hand half of FIG. 6, showing oversteer suppression control executed by way of braking force application to only the front-left wheel (the VDC controlled wheel) under the vehicle oversteer condition in the 2WD mode during cornering to the right, there is no transferred braking force applied to each VDC noncontrolled wheel. Thus, the braking force applied to the VDC controlled wheel (the front-left road wheel) produces a yawing moment (an oversteer suppression moment) tending to rotate the vehicle about the center of gravity in a direction (counterclockwise when looking the plan view of FIG. 6) that the vehicle oversteer tendency is reduced and suppressed. As a result, during the vehicle dynamics control under the vehicle oversteer condition in the 2WD mode, the actual vehicle-travel line of the vehicle, subjected to the oversteer suppression control, becomes substantially identical to the target vehicle-travel line LT.

On the contrary, as can be seen from the right-hand half of FIG. 6, showing oversteer suppression control executed by way of braking force application to only the front-left wheel (the VDC controlled wheel) under the vehicle oversteer condition in the 4WD mode during cornering to the right, a braking force substantially corresponding to the braking force, which is applied to only the front-left road wheel (the VDC controlled wheel) is transferred through transfer clutch 10 to the rear wheel axle. The transferred braking force is equally distributed into rear road wheels via the rear differential. On the other hand, with the front differential held in the differential free state in which the differential action of the front differential is allowed, there is no transferred braking force from the front-left road wheel (the VDC controlled wheel) to the front-right road wheel. Thus, due to the transferred braking force applied to each of the rear wheels (VDC noncontrolled wheels), a lateral grip force of each rear wheel on the road tends to reduce. Additionally, the transferred braking force applied to each of the rear wheels (VDC noncontrolled wheels), tends to undesirably produce a yawing moment increasing the oversteer tendency. As a result, during the vehicle dynamics control executed by the VDC system using the fixed VDC initiation threshold value under the vehicle oversteer condition in the 4WD mode, the actual vehicle-travel line of the vehicle, subjected to the oversteer suppression control, remarkably deviates from the target vehicle-travel line $L_T$. In this case, the actual vehicle-travel line corresponds to the vehicle-travel line $L_C$, which is obtained by the VDC system using the fixed VDC initiation threshold value and somewhat compensated for in the direction of oversteer suppression in comparison with the vehicle-travel line $L_N$ obtained in the VDC uncontrolled state in which the VDC function is disengaged.

As can be seen from the left-hand half of FIG. 7, showing understeer suppression control executed by way of braking force application to only the rear-right wheel (the VDC controlled wheel) under the vehicle understeer condition in the 2WD mode during cornering to the right, there is no transferred braking force applied to each VDC noncontrolled wheel. Thus, the braking force applied to the VDC controlled wheel (the rear-right road wheel) produces a yawing moment (an understeer suppression moment) tending to rotate the vehicle about the center of gravity in a direction (clockwise when looking the plan view of FIG. 7) that the vehicle understeer tendency is reduced and suppressed. As a result, during the vehicle dynamics control under the vehicle understeer condition in the 2WD mode, the actual vehicle-travel line of the vehicle, subjected to the understeer suppression control, becomes substantially identical to the target vehicle-travel line LT.

On the contrary, as can be seen from the right-hand half of FIG. 7, showing understeer suppression control executed by way of braking force application to only the rear-right wheel (the VDC controlled wheel) under the vehicle understeer condition in the 4WD mode during cornering to the right, a braking force substantially corresponding to the braking force, which is applied to only the rear-right road wheel (the VDC controlled wheel) is transferred through transfer clutch 10 to the front wheel axle. The transferred braking force is equally distributed into front road wheels via the front differential. On the other hand, with the rear differential held in the differential free state in which the differential action of the rear differential is allowed, there is no transferred braking force from the rear-right road wheel (the VDC controlled wheel) to the rear-left road wheel. Thus, due to the transferred braking force applied to each of the front wheels (VDC non-controlled wheels), a lateral grip force of each front wheel on the road tends to reduce. Additionally, the transferred braking force applied to each of the front wheels (VDC noncontrolled wheels), tends to undesirably produce a yawing moment increasing the understeer tendency. As a result, during the vehicle dynamics control executed by the VDC system using the fixed VDC initiation threshold value under the vehicle understeer condition in the 4WD mode, the actual vehicle-travel line of the vehicle, subjected to the understeer suppression control, remarkably deviates from the target vehicle-travel line $L_T$. The actual vehicle-travel line corresponds to the vehicle-travel line $L_C$, which is obtained by the VDC system using the fixed VDC initiation threshold value and somewhat compensated for in the direction of understeer suppression in comparison with the vehicle-travel line $L_N$ obtained in the VDC uncontrolled state in which the VDC function is disengaged.

As set forth above, during the vehicle dynamics control in the 2WD mode, it is possible to ensure the effect of properly stabilizing dynamic vehicle behavior with a fixed VDC initiation threshold value (normal VDC initiation threshold value $\alpha$). In contrast, during the vehicle dynamics control in the 4WD mode, owing to the transferred braking force, occurring due to transfer clutch 10 (differential limiting means between front and rear wheel axles) engaged, the effect of stabilizing dynamic vehicle behavior with the fixed VDC initiation threshold value is largely lowered. This phenomenon is called "control interference" between vehicle dynamics control and four-wheel-drive control (differential limiting control).

Such undesirable control interference results from the transferred braking force as discussed above. The magnitude of transferred braking force is substantially proportional to the magnitude of braking force applied to the VDC controlled wheel during vehicle dynamics control. Thus, the greater the magnitude of braking force applied to the VDC controlled wheel during vehicle dynamics control, the greater the control interference between the VDC system and the differential limiting control system. In other words, the smaller the magnitude of braking force applied to the VDC controlled wheel during vehicle dynamics control, the smaller the control interference.

[The Effects of Varying VDC Initiation Threshold Value]

As shown in the right-hand half of FIG. 6, when oversteer suppression control is initiated by way of braking force application to only the front-left wheel (the VDC controlled wheel) under the vehicle oversteer condition in the differential limited state, that is, with transfer clutch 10 engaged, in other words, in the 4WD mode, during cornering to the right, VDC initiation threshold value $\beta$ ($<\alpha$) suitable for the differential limited state is set as the final VDC initiation threshold value, which is compared to the calculated yaw-rate deviation $\Delta\phi n$ ($=\phi-\phi^*$) and used as a decision criterion for initiating vehicle dynamics control. Owing to setting of the final VDC initiation threshold value to the relatively lower VDC initiation threshold value $\beta$($<\alpha$), the vehicle dynamics control (oversteer suppression control) can be initiated at a relatively earlier timing at which the vehicle oversteer tendency does not yet sufficiently develop. Therefore, as can be seen from the right-hand half (oversteer suppression control in the 4WD mode) of FIG. 6, the braking force applied to the front-left wheel produces a relatively small yawing moment (a relatively small oversteer suppression moment) tending to rotate the vehicle about the center of gravity in the direction (counterclockwise when looking the plan view of FIG. 6) that the weak vehicle oversteer tendency is reduced and suppressed. In this case, the vehicle-travel line $L_I$, which is obtained by the VDC system using the variable or switchable VDC initiation threshold value determined based on whether the vehicle is in the differential limited state or in the differential non-limited state, becomes substantially identical to the target vehicle-travel line $L_T$.

As shown in the right-hand half of FIG. 7, when understeer suppression control is initiated by way of braking force application to only the rear-right wheel (the VDC controlled wheel) under the vehicle understeer condition in the differential limited state, that is, with transfer clutch 10 engaged, in other words, in the 4WD mode, during cornering to the right, VDC initiation threshold value $\beta$ ($<\alpha$) suitable for the differential limited state is set as the final VDC initiation threshold value, which is compared to the calculated yaw-rate deviation $\Delta\phi n$ ($=\phi-\phi^*$) and used as a decision criterion for initiating vehicle dynamics control. Owing to setting of the final VDC initiation threshold value to the relatively lower VDC initiation threshold value $\beta$ ($<\alpha$), the vehicle dynamics control (understeer suppression control) can be initiated at a relatively earlier timing at which the vehicle understeer tendency does not yet sufficiently develop. Therefore, as can be seen from the right-hand half (understeer suppression control in the 4WD mode) of FIG. 7, the braking force applied to the rear-right wheel produces a relatively small yawing moment (a relatively small understeer suppression moment) tending to rotate the vehicle about the center of gravity in the direction (clockwise when looking the plan view of FIG. 7) that the weak vehicle understeer tendency is reduced and suppressed. In this case, the vehicle-travel line $L_I$, which is obtained by the VDC system using the variable or switchable VDC initiation threshold value determined based on whether the vehicle is in the differential limited state or in the differential non-limited state, becomes substantially identical to the target vehicle-travel line $L_T$.

As discussed above, in the differential limited state, the vehicle dynamics control can be started at a relatively earlier timing by selecting the relatively lower VDC initiation threshold value $\beta$ ($<\alpha$) instead of using the relatively higher VDC initiation threshold value $\alpha$ for the VDC system using the fixed VDC initiation threshold value. That is, by virtue of quick braking force control and quick engine power output control, both rapidly initiated due to the relatively lower VDC initiation threshold value $\beta$ ($<\alpha$), the vehicle can be timely decelerated, thus enabling the grip force of each tire on the road to rapidly recover such that the actual vehicle cornering behavior can be properly quickly brought closer to the desired vehicle cornering behavior. Additionally, the vehicle dynamics control can be initiated at the relatively earlier timing at which yaw-rate deviation $\Delta\phi n$ ($=\phi-\phi^*$) is still small, and thus the level of the braking force applied to the VDC controlled wheel for suppressing weak vehicle understeer or oversteer tendencies, is still low. Application of the relatively low braking force contributes to reduced control interference between vehicle dynamics control (oversteer or understeer suppression control) and differential limiting action. Thus, according to the VDC apparatus of the embodiment using the variable or switchable VDC initiation threshold value ($\alpha$, $\beta$), it is possible to enhance the ability to stabilize dynamic vehicle behavior (vehicle cornering behavior), while suppressing the control interference without lowering the vehicle dynamics control performance. That is, it is possible to optimize the vehicle dynamics control depending on whether the vehicle is in the differential limited state or in the differential non-limited state.

The VDC apparatus of the embodiment, using the variable or switchable VDC initiation threshold value ($\alpha$, $\beta$) and executing the VDC routine of FIG. 2, provides the following effects (1), (2), and (3).

(1) In the VDC apparatus of the embodiment for an automotive vehicle employing VDC ECU 23 that controls a braking force of at least one road wheel for the purpose of controlling vehicle cornering behavior (dynamic vehicle behavior) depending on the vehicle's turning conditions independently of the braking action of the driver, and a first differential limiting unit (first differential limiting means, e.g., transfer clutch 10) capable of limiting a differential motion between front and rear wheel axles and/or a second differential limiting unit (second differential limiting means, e.g., differential limiting clutch 7) capable of limiting a differential motion between left and right wheel axles, provided are (i) a first differential limiting state detection step S1 that detects or determines whether a front-and-rear wheel speed difference is limited or allowed, and (ii) a second differential limiting state detection step S2 that detects or determines whether a left-and-right wheel speed difference is limited or allowed. Only when the first differential limiting state detection step S1 determines that the front-and-rear wheel speed difference is limited or the second differential limiting state detection step S2 determines that the left-and-right wheel speed difference is limited, VDC ECU 23 operates to advance the VDC initiation timing by selecting a lower one $\beta$ ($<\alpha$) of the two different VDC initiation threshold values $\alpha$ and $\beta$. Thus, in the VDC apparatus of the embodiment using the variable or switchable VDC initiation threshold value, it is possible to eliminate any unnatural feeling (e.g., an unintended vehicle deceleration) that the driver may experience during cornering in the differential non-limited state. Additionally, it is possible to effectively suppress or reduce the control interference between vehicle dynamics control and differential limiting action during cornering in the differential limited state. Furthermore, it is possible to enhance the ability to stabilize dynamic vehicle behavior during cornering in the differential limited state.

(2) When VDC ECU 23 determines that the front-and-rear wheel speed difference is limited by means of the first differential limiting unit (e.g., transfer clutch 10) or the left-and-right wheel speed difference is limited by means of the second differential limiting unit (e.g., differential limiting clutch 7), VDC ECU 23 sets or changes the final VDC initiation threshold value to the relatively lower VDC initiation threshold value $\beta$ ($<\alpha$) suitable for the differential limited state, so as to advance the VDC initiation timing. In this manner, according to the VDC apparatus of the embodiment, it is possible to easily effectively advance the VDC initiation timing by way of only a switching operation ($\alpha \rightarrow \beta$) of the final VDC initiation threshold value to the relatively lower VDC initiation threshold value $\beta$ ($<\alpha$).

(3) VDC ECU 23 of the embodiment executing the routine of FIG. 2 uses a primary vehicle-dynamics-control initiation threshold value (i.e., a relatively higher VDC initiation threshold value $\alpha$) suitable for the differential non-limited state and a secondary vehicle-dynamics-control initiation threshold value (i.e., a relatively lower VDC initiation threshold value $\beta$ ($<\alpha$)) suitable for the differential limited state. In the differential non-limited state, VDC ECU 23 selects the higher one ($\alpha$) of the two different threshold values $\alpha$ and $\beta$ as the final VDC initiation threshold value, and executes the vehicle dynamics control based on the comparison result between yaw-rate deviation $\Delta\phi n$ ($=\phi-\phi^*$) and the relatively higher VDC initiation threshold value $\alpha$. On the contrary, in the differential limited state, VDC ECU 23 selects the relatively lower VDC initiation threshold value $\beta$ as the final VDC initiation threshold value, and executes the vehicle dynamics control based on the comparison result between yaw-rate deviation $\Delta\phi n$ ($=\phi-\phi^*$) and the relatively lower VDC initiation threshold value $\beta$. It is possible to attain the previously-noted effects, namely (i) elimination of unnatural feeling (unintended vehicle deceleration) experienced by the driver during cornering in the differential non-limited state, (ii) suppression in undesirable control interference occurring during cornering in the differential limited state, and (iii) enhanced cornering stability in the differential limited state, by simply switching from one of the two different VDC initiation threshold values $\alpha$ and $\beta$ to the other, depending on whether the vehicle is in the differential non-limited state or in the differential limited state.

Figure 8:
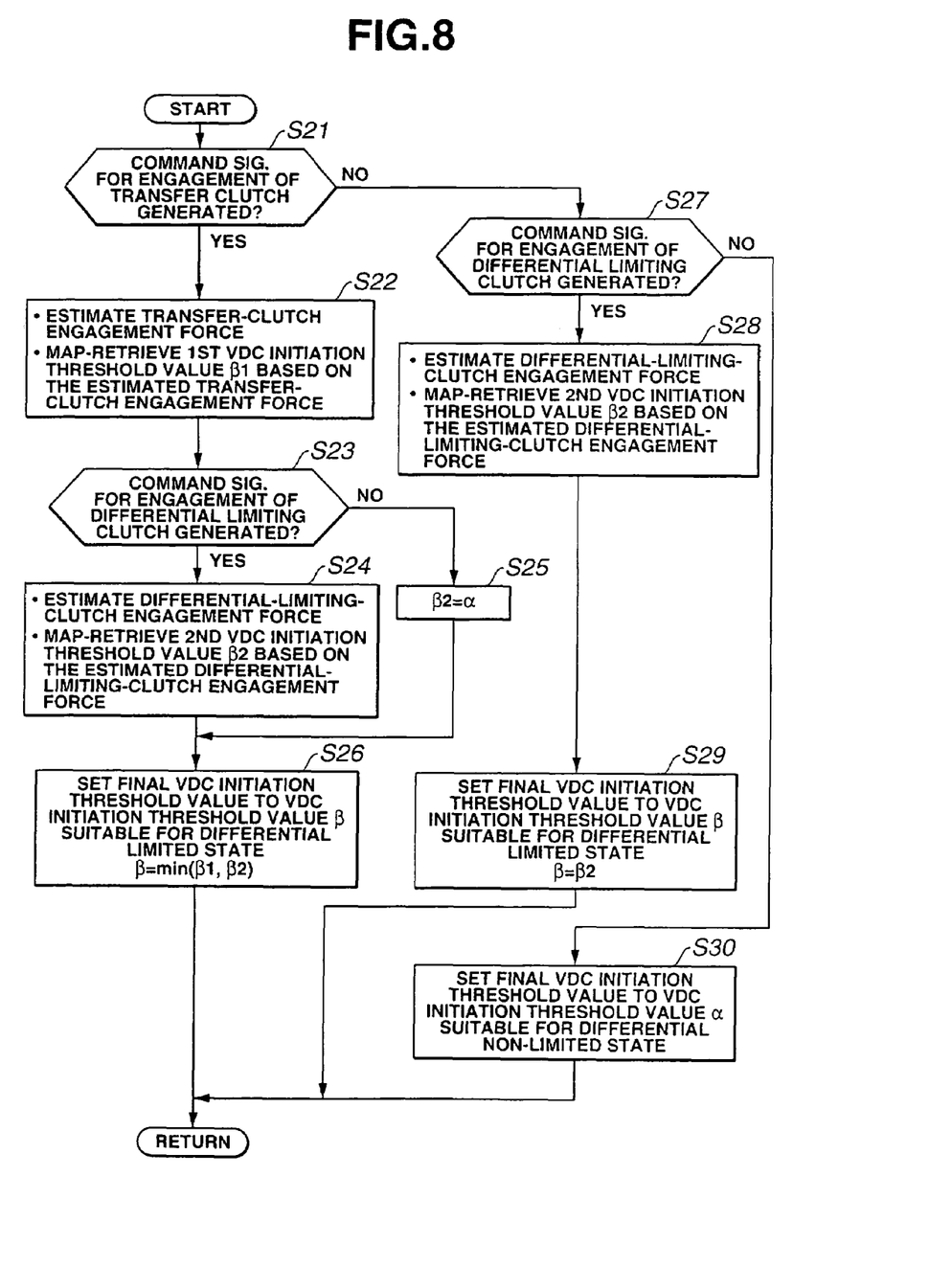
FIG. 8 is a flow chart showing a modified vehicle dynamics control (VDC) routine (or a modified vehicle behavior control (VBC) routine) executed within the VDC ECU incorporated in the VDC apparatus of the embodiment.

Referring now to FIG. 8, there is shown the modified vehicle dynamics control (VDC) routine. As previously described, in the VDC apparatus of the embodiment executing the VDC routine of FIG. 2, transfer clutch 10 (first differential limiting means) capable of limiting a differential motion between front and rear wheel axles is operated in either one of two different operating modes, namely a full-engagement mode and a full-disengagement mode, differential limiting clutch 7 (second differential limiting means) is comprised of a differential-lock clutch capable of limiting a differential motion between left and right wheel axles is operated in either one of two different operating modes, namely a full-engagement mode and a full-disengagement mode, and the final VDC initiation threshold value is switchable only between the two different threshold values $\alpha$ and $\beta$ depending on whether the vehicle is in the differential non-limited state or in the differential limited state. On the other hand, in the VDC apparatus of the embodiment executing the modified VDC routine of FIG. 8, transfer clutch 10 (1st differential limiting means) is comprised of a hydraulically-operated clutch or an electromagnetically-operated clutch whose engagement force is continuously variably controlled based on the front-and-rear wheel speed difference, differential limiting clutch 7 (2nd differential limiting means) is also comprised of a hydraulically-operated clutch or an electromagnetically-operated clutch whose engagement force is continuously variably controlled based on the wheel speed difference between rear-left and rear-right wheels, and the final VDC initiation threshold value is continuously variably controlled responsively to the degree of limitation of the differential motion between front and rear wheel axles and/or the degree of limitation of the differential motion between left and right wheel axles. The modified routine shown in FIG. 8 is also executed as time-triggered interrupt routines to be triggered every predetermined sampling time intervals.

At step S21, a check is made to determine, based on input information from 4WD/DIFF ECU 22 regarding which state the transfer clutch 10 is in, whether a command signal generated from 4WD/DIFF ECU 22 for engagement of transfer clutch 10 is present or absent. When the answer to step S21 is in the affirmative (YES), that is, in presence of the output of the command signal for engagement of transfer clutch 10, the routine proceeds from step S21 to step S22. Conversely when the answer to step S21 is in the negative (NO), that is, in absence of the output of the command signal for engagement of transfer clutch 10, the routine proceeds from step S21 to step S27.

Figure 9:
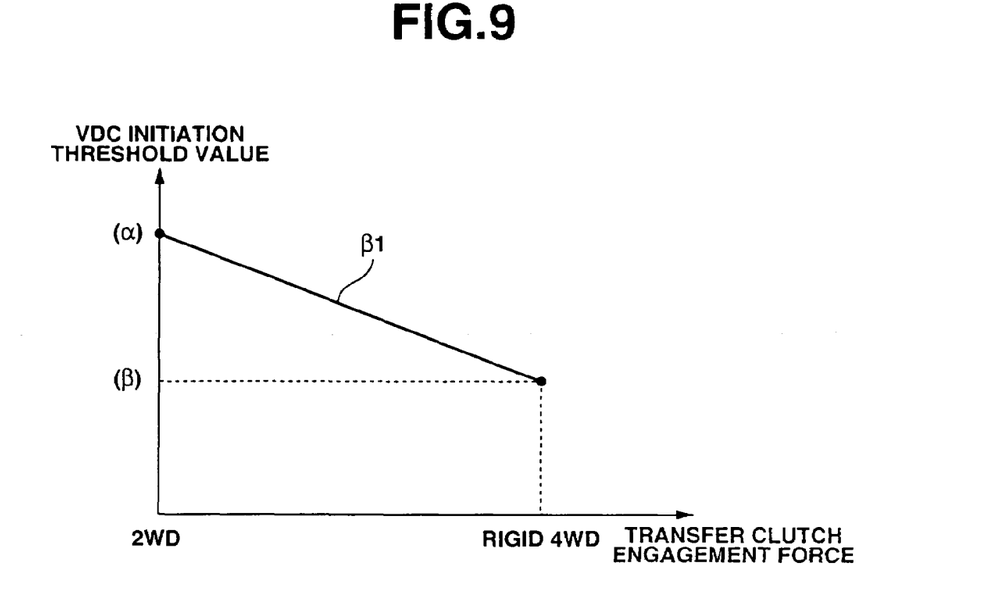
FIG. 9 is a predetermined transfer-clutch engagement force versus 1st VDC initiation threshold value $\beta 1$ characteristic map related to step S22 of FIG. 8.

At step S22, the processor of VDC ECU 23 estimates, based on the command signal value from the output interface of VDC ECU 23 to transfer clutch 10, an engagement force of transfer clutch 10. The processor of VDC ECU 23 calculates or retrieves a first VDC initiation threshold value $\beta1$ based on the estimated engagement force of transfer clutch 10 from the predetermined transfer-clutch engagement force versus 1st VDC initiation threshold value $\beta1$ characteristic map shown in FIG. 9. Thereafter, the routine proceeds from step S22 to step S23. As seen from the predetermined transfer-clutch engagement force versus 1st VDC initiation threshold value $\beta1$ characteristic map shown in FIG. 9, in the differential non-limited state of the first differential limiting unit (i.e., transfer clutch 10) capable of limiting a differential motion between front and rear wheel axles, in other words, in the 2WD mode, the first VDC initiation threshold value $\beta1$ is set to the maximum threshold value corresponding to normal VDC initiation threshold value a. In the maximum differential limited state of the first differential limiting unit (i.e., transfer clutch 10), in other words, in the rigid 4WD mode, the first VDC initiation threshold value $\beta1$ is set to the minimum threshold value corresponding to VDC initiation threshold value $\beta$ ($<\alpha$). That is, the predetermined transfer-clutch engagement force versus 1st VDC initiation threshold value $\beta1$ characteristic is obtained as a straight line interconnecting the point of the maximum threshold value (normal VDC initiation threshold value $\alpha$) in the 2WD mode and the point of the minimum threshold value (VDC initiation threshold value $\beta$ ($<\alpha$)) in the rigid 4WD mode. In other words, the predetermined transfer-clutch engagement force versus 1st VDC initiation threshold value $\beta1$ characteristic is set as a linear characteristic that 1st VDC initiation threshold value $\beta1$ reduces in a linear fashion, as the transfer-clutch engagement force increases. In lieu thereof, the predetermined transfer-clutch engagement force versus 1st VDC initiation threshold value $\beta1$ characteristic may be set as a concave-up or concave-down curved characteristic that 1st VDC initiation threshold value $\beta1$ reduces like a concave-up or concave-down quadratic curve, as the transfer-clutch engagement force increases. Alternatively, the predetermined transfer-clutch engagement force versus 1st VDC initiation threshold value $\beta1$ characteristic may be set as a stepwise characteristic that 1st VDC initiation threshold value $\beta1$ reduces in a stepwise manner, as the transfer-clutch engagement force increases.

At step S23, a check is made to determine, based on input information from 4WD/DIFF ECU 22 regarding which state the differential limiting clutch 7 is in, whether a command signal generated from 4WD/DIFF ECU 22 to differential limiting clutch 7 for engagement of differential limiting clutch 7 is present or absent. When the answer to step S23 is affirmative (YES), that is, in presence of the output of the command signal for engagement of differential limiting clutch 7, the routine proceeds from step S23 to step S24. Conversely when the answer to step S23 is negative (NO), that is, in absence of the output of the command signal for engagement of differential limiting clutch 7, the routine proceeds from step S23 to step S25.

Figure 10:
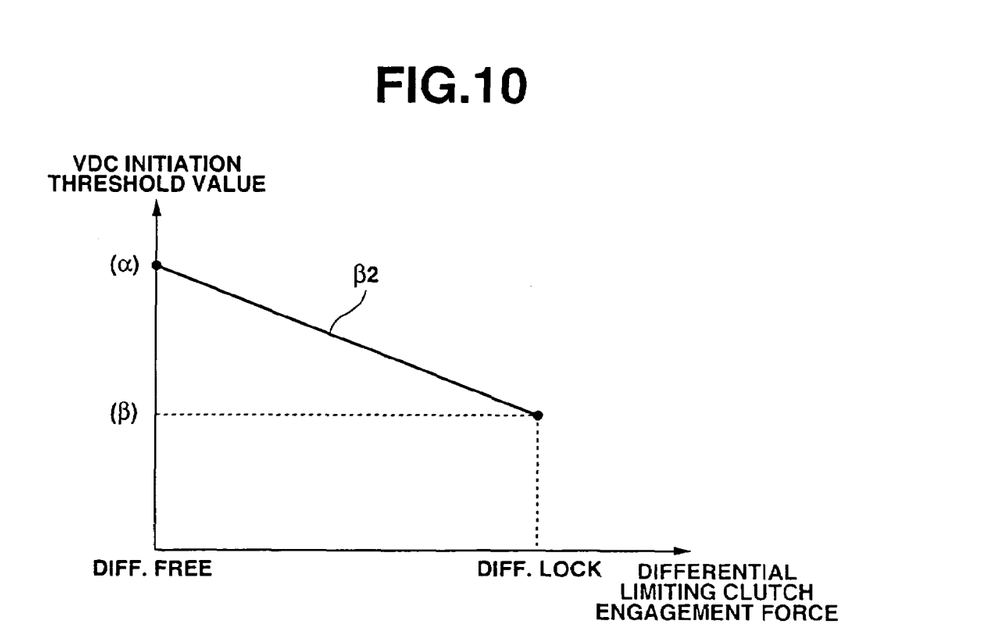
FIG. 10 is a predetermined differential-limiting-clutch engagement force versus 2nd VDC initiation threshold value $\beta 2$ characteristic map related to steps S24 and S28 of FIG. 8.

At step S24, the processor of VDC ECU 23 estimates, based on the command signal value from the output interface of VDC ECU 23 to differential limiting clutch 7, an engagement force of differential limiting clutch 7. The processor of VDC ECU 23 calculates or retrieves a second VDC initiation threshold value $\beta2$ based on the estimated engagement force of differential limiting clutch 7 from the predetermined differential-limiting-clutch engagement force versus 2nd VDC initiation threshold value $\beta2$ characteristic map shown in FIG. 10. Thereafter, the routine proceeds from step S24 to step S26. As seen from the predetermined differential-limiting-clutch engagement force versus 2nd VDC initiation threshold value $\beta2$ characteristic map shown in FIG. 10, in the differential non-limited state of the second differential limiting unit (i.e., differential limiting clutch 7) capable of limiting a differential motion between rear-left and rear-right wheel axles, in other words, in the differential free mode, the second VDC initiation threshold value $\beta2$ is set to the maximum threshold value corresponding to normal VDC initiation threshold value $\alpha$. In the maximum differential limited state of the second differential limiting unit (i.e., differential limiting clutch 7), in other words, in the differential lock mode, the second VDC initiation threshold value $\beta2$ is set to the minimum threshold value corresponding to VDC initiation threshold value $\beta$ ($<\alpha$). That is, the predetermined differential-limiting-clutch engagement force versus 2nd VDC initiation threshold value $\beta2$ characteristic is obtained as a straight line interconnecting the point of the maximum threshold value (normal VDC initiation threshold value $\alpha$) in the differential free mode and the point of the minimum threshold value (VDC initiation threshold value $\beta$ ($<\alpha$)) in the differential lock mode. In other words, the predetermined differential-limiting-clutch engagement force versus 2nd VDC initiation threshold value $\beta2$ characteristic is set as a linear characteristic that 2nd VDC initiation threshold value $\beta2$ reduces in a linear fashion, as the differential-limiting-clutch engagement force increases. In lieu thereof, the predetermined differential-limiting-clutch engagement force versus 2nd VDC initiation threshold value $\beta2$ characteristic may be set as a concave-up or concave-down curved characteristic that 2nd VDC initiation threshold value $\beta2$ reduces in the form of a concave-up or concave-down quadratic curve, as the differential-limiting-clutch engagement force increases. Alternatively, the predetermined differential-limiting-clutch engagement force versus 2nd VDC initiation threshold value $\beta2$ characteristic may be set as a stepwise characteristic that 2nd VDC initiation threshold value $\beta2$ reduces in a stepwise manner, as the differential-limiting-clutch engagement force increases.

At step S25, 2nd VDC initiation threshold value $\beta2$ is set to the maximum threshold value (normal VDC initiation threshold value $\neq$), that is, $\beta2=\alpha$. Thereafter, the routine flows from step S25 to step S26.

At step S26, a lower one of the first and second VDC initiation threshold values $\beta1$ and $\beta2$ is selected and determined as the final VDC initiation threshold value, i.e., VDC initiation threshold value $\beta$ suitable for the differential limited state, by way of a so-called select-LOW process $\beta=\min(\beta1, \beta2)$. After step S26, the main program is returned.

At step S27, a check is made to determine, based on input information from 4WD/DIFF ECU 22 regarding which state the differential limiting clutch 7 is in, whether a command signal generated from 4WD/DIFF ECU 22 to differential limiting clutch 7 for engagement of differential limiting clutch 7 is present or absent. When the answer to step S27 is affirmative (YES), that is, in presence of the output of the command signal for engagement of differential limiting clutch 7, the routine proceeds from step S27 to step S28. Conversely when the answer to step S27 is negative (NO), that is, in absence of the output of the command signal for engagement of differential limiting clutch 7, the routine proceeds from step S27 to step S30.

At step S28, in the same manner as step S24, the processor of VDC ECU 23 estimates, based on the command signal value from the output interface of VDC ECU 23 to differential limiting clutch 7, an engagement force of differential limiting clutch 7. The processor of VDC ECU 23 calculates or retrieves a second VDC initiation threshold value β2 based on the estimated engagement force of differential limiting clutch 7 from the predetermined differential-limiting-clutch engagement force versus 2nd VDC initiation threshold value β2 characteristic map shown in FIG. 10. Thereafter, the routine proceeds from step S28 to step S29.

At step S29, the second VDC initiation threshold value β2, calculated or map-retrieved through step S28, is set or determined as the final VDC initiation threshold value, i.e., VDC initiation threshold value β suitable for the differential limited state, that is, β=β2.

At step S30, under the condition where the first differential limiting unit (transfer clutch 10) and the second differential limiting unit (differential limiting clutch 7) are both disengaged, the maximum threshold value (normal VDC initiation threshold value α) is set or determined as the final VDC initiation threshold value.

[Vehicle Dynamics Control (VDC) Action]

In the rear-wheel-drive mode (in the 2WD mode) in which differential limiting clutch 7 and transfer clutch 10 are both disengaged, the modified VDC routine of FIG. 8 flows from step S21 through step S27 to step S30. Thus, at step S30, normal VDC initiation threshold value α suitable for the differential non-limited state is set as the final VDC initiation threshold value.

In the differential limited state between front and rear wheel axles in which only the transfer clutch 10 is engaged, but differential limiting clutch 7 is disengaged, the modified VDC routine of FIG. 8 flows from step S21 through steps S22, S23 and S25 to step S26. Thus, 2nd VDC initiation threshold value β2 is set to the maximum threshold value (normal VDC initiation threshold value α), that is, β2=α at step S25, and thereafter VDC initiation threshold value β (=β1) suitable for the differential limited state is set as the final VDC initiation threshold value at step S26, because of β=min(β1, β2)=min(β1, α)=β1.

In the differential limited state between rear-left and rear-right wheel axles in which only the differential limiting clutch 7 is engaged, but transfer clutch 10 is disengaged, the modified VDC routine of FIG. 8 flows from step S21 through steps S27 and S28 to step S29. Thus, at step S29, 2nd VDC initiation threshold value β2 is set as the final VDC initiation threshold value, i.e., VDC initiation threshold value β suitable for the differential limited state, that is, β=β2.

In the differential limited state between rear-left and rear-right wheel axles and between front and rear wheel axles in which differential limiting clutch 7 and transfer clutch 10 are both engaged, the modified VDC routine of FIG. 8 flows from step S21 through steps S22, S23 and S24 to step S26. Thus, a lower one of 1st VDC initiation threshold value β1 retrieved based on the engagement force of transfer clutch 10 and 2nd VDC initiation threshold value β2 retrieved based on the engagement force of differential limiting clutch 7 is determined as the final VDC initiation threshold value, i.e., VDC initiation threshold value β suitable for the differential limited state, that is, β=min(β1, β2).

As discussed above, according to the VDC apparatus executing the modified VDC routine of FIG. 8, during cornering in the differential limited state in which at least one of the first and second differential limiting units (transfer clutch 10 and differential limiting clutch 7) is in the engaged state, as soon as yaw-rate deviation Δφn (=φ−φ*) between actual yaw rate φ and desired yaw rate φ* exceeds the relatively lower VDC initiation threshold value β (<α), actual yaw rate φ can be rapidly brought closer to desired yaw rate φ* by way of quick braking force control and quick engine power output control, both rapidly initiated due to the relatively lower VDC initiation threshold value β (<α).

That is, there is a correlation between the differential limiting degree and the control interference resulting from the transferred braking force. The weaker the differential limiting degree, the smaller the control interference. In other words, the stronger the differential limiting degree, the greater the control interference. For the reasons discussed above, in case of the weaker differential limiting degree, VDC initiation threshold value β is increasingly compensated for, so that vehicle dynamics control does not easily come into operation. Conversely in case of the stronger differential limiting degree, VDC initiation threshold value β is decreasingly compensated for, so that vehicle dynamics control easily quickly comes into operation. Therefore, according to the VDC apparatus executing the modified VDC routine of FIG. 8, it is possible to greatly reconcile two requirements, that is, avoidance of control interference and enhanced vehicle dynamics control performance.

Furthermore, when transfer clutch 10 and differential limiting clutch 7 are both engaged, that is, when the first and second differential limiting units are both in the differential limited states, by way of the select-LOW process β=min(β1, β2), a lower one of 1st VDC initiation threshold value β1 adapted to enable the VDC function depending on the engagement force (the differential limiting degree) of the first differential unit (transfer clutch 10) and 2nd VDC initiation threshold value β2 adapted to enable the VDC function depending on the engagement force (the differential limiting degree) of the second differential unit (differential limiting clutch 7) is set or determined as VDC initiation threshold value β. In comparison with a method to set or determine VDC initiation threshold value P by way of a so-called select-HIGH process β=max(β1, β2) through which a higher one of the first and second threshold values β1 and β2 is determined as VDC initiation threshold value β, or a method to set or determine VDC initiation threshold value β by way of a simple mean β=(β1+β2)/2 of the first and second threshold values β1 and β2, the select-LOW process β=min(β1, β2) is superior in more advanced VDC initiation timing. The more advanced VDC initiation timing enhances the control-interference suppressing effect.

The VDC apparatus executing the modified VDC routine of FIG. 8, provides the following effects (4) and (5), in addition to the same effects (1) and (2) as the VDC apparatus executing the routine of FIG. 2.

(4) According to the VDC apparatus executing the modified routine of FIG. 8, the differential limiting means (transfer clutch 10 and differential limiting clutch 7) is constructed as a variable differential limiting means capable of variably continuously adjusting the degree of limitation of the differential motion between front and rear wheel axles and/or the degree of limitation of the differential motion between left and right wheel axles, within a range from a differential non-limited state (a clutch disengaged state) via a differential partially-limited state (a clutch partially-engaged state) to a differential fully-limited state (a clutch fully-engaged state). Also provided are the differential limiting degree detection steps S22, S24, and S28 that detect or estimate the degree of limitation of the differential motion between front and rear wheel axles and the degree of limitation of the differential motion between left and right wheel axles. For calculation or retrieval or determination of the final VDC initiation threshold value, VDC ECU 23 uses a preprogrammed clutch engagement force versus VDC initiation threshold value characteristic that a final VDC initiation threshold value continuously decreases from the maximum threshold value corresponding to normal VDC initiation threshold value α to the minimum threshold value corresponding to VDC initiation threshold value β (<α), as a clutch engagement force increases. Taking into account both of (i) 1st VDC initiation threshold value β1 determined based on the engagement force (the first differential limiting degree) of the first differential unit (transfer clutch 10) and the preprogrammed clutch engagement force versus 1st VDC initiation threshold value β1 characteristic map, and (ii) 2nd VDC initiation threshold value β2 determined based on the engagement force (the second differential limiting degree) of the second differential unit (differential limiting clutch 7) and the preprogrammed clutch engagement force versus 2nd VDC initiation threshold value β2 characteristic map, the VDC initiation timing can be precisely determined. Therefore, according to the VDC apparatus executing the modified VDC routine of FIG. 8, it is possible to greatly reconcile two requirements, that is, avoidance of control interference and enhanced vehicle dynamics control performance, taking account of both of the degree of limitation of the differential motion between front and rear wheel axles (the magnitude of engagement force of transfer clutch 7) and the degree of limitation of the differential motion between left and right wheel axles (the magnitude of engagement force of differential limiting clutch 7).

(5) Transfer clutch 10 and differential limiting clutch 10 are used as the differential limiting means. In the differential limited state of transfer clutch 10 and additionally in the differential limited state of differential limiting clutch 7 (see the flow from step S21 through steps S22, S23 and S24 to step S26 in FIG. 8), the VDC initiation timing is determined by setting the select-LOW value β=min(β1, β2) of (i) 1st VDC initiation threshold value β1 determined based on the engagement force (the first differential limiting degree) of the first differential limiting unit (transfer clutch 10) and (ii) 2nd VDC initiation threshold value β2 determined based on the engagement force (the second differential limiting degree) of the second differential limiting unit (differential limiting clutch 7) as the final VDC initiation threshold value, i.e., VDC initiation threshold value β suitable for the differential limited state. Thus, even in the differential limited state that either one of the first and second differential limiting units (transfer clutch 10 and differential limiting clutch 7) is strongly engaged, it is possible to certainly prevent or suppress the undesirable control interference.

In the VDC apparatus of the shown embodiment, an on-demand transfer clutch, for example, a hydraulically-operated clutch or an electromagnetically-operated clutch whose engagement force is continuously variably controlled based on the front-and-rear wheel speed difference, is exemplified as a front-and-rear wheel axle differential limiting means. In lieu thereof, another type of clutches, such as a viscous coupling type transfer clutch, a dog clutch, a manually-operated center differential lock mechanism, and the like may be used as the front-and-rear wheel axle differential limiting means. In other words, all types of clutches, through each of which a braking force created by vehicle dynamics control is transferred from a VDC controlled wheel to a first wheel axle of front and rear wheel axles, opposite to the second wheel axle associated with the VDC controlled wheel, can be classified as the front-and-rear wheel axle differential limiting means. In a similar manner, as a left-and-right wheel axle differential limiting means, an on-demand differential limiting clutch, for example, a hydraulically-operated clutch or an electromagnetically-operated clutch whose engagement force is continuously variably controlled based on the left-and-right wheel speed difference, may be used. In lieu thereof, another type of clutches, such as a viscous coupling type clutch, a dog clutch, a manually-operated differential lock mechanism, and the like may be used as the left-and-right wheel axle differential limiting means.

In the VDC apparatus executing the modified routine of FIG. 8, a clutch engagement force is estimated based on a command signal value from the output interface of VDC ECU 23 to a differential limiting unit (transfer clutch 10 or differential limiting clutch 7). In case of the use of a viscous coupling clutch whose engagement force is mechanically-rather than electronically-controlled, there is no command signal to the viscous coupling. In this case, the differential limited or non-limited state may be estimated based on the wheel speed difference between road wheels whose differential motion is limited, the waveform of wheel speeds, or the frequencies of wheel speeds.

The VDC apparatus of the invention is exemplified in an automotive vehicle employing a front-and-rear wheel differential limiting means (e.g., transfer clutch 10) and a left-and-right wheel differential limiting means (e.g., differential limiting clutch 7). It will be appreciated that the fundamental concept of the invention can also be applied to an automotive vehicle employing either one of a front-and-rear wheel differential limiting means (e.g., transfer clutch 10) and a left-and-right wheel differential limiting means (e.g., differential limiting clutch 7).

In the VDC apparatus of the embodiment executing the VDC routine shown in FIG. 2 or 8, as a method to advance the VDC initiation timing in the differential limited state, a VDC initiation threshold value itself is decreasingly compensated for or switched from a relatively higher threshold value α to a relatively lower threshold value β (<α). Instead of compensating for the VDC initiation threshold value itself depending on whether the vehicle is in the differential limited state or in the differential non-limited state, at least one of factors calculating or deriving yaw-rate deviation Δφn (=φ−φ*), namely actual yaw rate φ and desired yaw rate φ*, may be properly compensated for in such a manner as to advance the VDC initiation timing in presence of a transition from the differential non-limited state to the differential limited state. In this case, the VDC initiation threshold value itself has to be fixed.

The entire contents of Japanese Patent Application No. 2003-125200 (filed Apr. 30, 2003) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A vehicle dynamics control (VDC) apparatus for an automotive vehicle with a differential limiting device configured to limit at least one of (1) a differential motion between front and rear wheel axles, and (2) a differential motion between left and right wheel axles, comprising:

a VDC system that controls a braking force of at least one of road wheels to control vehicle cornering behavior depending on a vehicle's turning condition;

wherein the VDC system is configured to initiate vehicle dynamics control at an earlier time for a differential limited state than for a differential non-limited state;

wherein in the differential limited state at least one of front-and-rear wheel axle differential motion and left-and-right wheel axle differential motion is limited;

wherein in the differential non-limited state the front-and-rear wheel axle differential motion and the left-and-right wheel axle differential motion are not limited;

wherein the VDC system is configured to use a first VDC initiation threshold value preprogrammed for the differential limited state and a second VDC initiation threshold value preprogrammed for the differential non-limited state; and wherein the VDC system is configured to initiate the vehicle dynamics control at the earlier time for the differential limited state than for the differential non-limited state because the first VDC initiation threshold value is lower than the second VDC initiation threshold value.

2. The VDC apparatus as claimed in claim 1, wherein the VDC system is configured to initiate vehicle dynamics control at the earlier time for the differential limited state than for the differential non-limited state with reference to a control reference time.

3. The VDC apparatus as claimed in claim 1, wherein:

the differential limiting device comprises a variable differential limiting device capable of variably continuously adjusting a degree of limitation of the differential motion from the differential non-limited state via a differential partially-limited state to a differential fully-limited state;

the VDC system is configured to determine a VDC initiation threshold value based on the degree of limitation of the differential motion from a predetermined VDC initiation threshold value characteristic that reduces as the degree of limitation of the differential motion increases, when the vehicle is in the differential partially-limited state or in the differential fully-limited state; and the VDC system is configured to determine the VDC initiation timing based on the VDC initiation threshold value calculated from the predetermined VDC initiation threshold value characteristic, when the vehicle is in the differential partially-limited state or in the differential fully-limited state.

4. The VDC apparatus as claimed in claim 3, wherein:

the differential limiting device comprises a first differential limiting unit capable of limiting differential motion between the front and rear wheel axles and a second differential limiting unit capable of limiting differential motion between the left and right wheel axles;

the VDC system is configured to select a lower one of a third VDC initiation threshold value determined based on the degree of limitation of the differential motion of the first differential limiting unit and a fourth VDC initiation threshold value determined based on the degree of limitation of the differential motion of the second differential limiting unit as a final VDC initiation threshold value, in the differential limited state of the first differential limiting unit and additionally in the differential limited state of the second differential limiting unit; and the VDC system is configured to initiate the vehicle dynamics control at a timing, which is determined based on the selected VDC initiation threshold value.

5. A vehicle dynamics control (VDC) apparatus for an automotive vehicle with differential limiting means for limiting at least one of (1) a differential motion between front and rear wheel axles, and (2) a differential motion between left and right wheel axles, comprising:

vehicle dynamics control (VDC) means for controlling a braking force of at least one of road wheels to control vehicle cornering behavior depending on a vehicle's turning condition, wherein the VDC means is configured to initiate vehicle dynamics control at an earlier time for a differential limited state than for a differential non-limited state;

wherein in the differential limited state at least one of front-and-rear wheel axle differential motion and left-and-right wheel axle differential motion is limited;

wherein in the differential non-limited state the front-and-rear wheel axle differential motion and the left-and-right wheel axle differential motion are not limited;

wherein the VDC means is configured to use a first VDC initiation threshold value preprogrammed for the differential limited state and a second VDC initiation threshold value preprogrammed for the differential non-limited state; and wherein the VDC means is configured to initiate the vehicle dynamics control at the earlier initiation time for the differential limited state than for the differential non-limited state because the first VDC initiation threshold value is lower than the second VDC initiation threshold value.

6. The VDC apparatus as claimed in claim 5, wherein the VDC means is configured to initiate vehicle dynamics control at the earlier time for the differential limited state than for the differential non-limited state with reference to a control reference time.

\* \* \* \* \*